March 5, 1957 P. ZUK 2,784,300

METHOD OF FABRICATING AN ELECTRICAL CONNECTION

Filed Dec. 29, 1954

INVENTOR
P. ZUK
BY [signature]
ATTORNEY

United States Patent Office 2,784,300

Patented Mar. 5, 1957

2,784,300

METHOD OF FABRICATING AN ELECTRICAL CONNECTION

Paul Zuk, Allentown, Pa., assignor to Bell Telephone Laboratories, Incorporated, New York, N. Y., a corporation of New York Application December 29, 1954, Serial No. 478,442

3 Claims. (Cl. 219—117)

This invention relates to methods for fabricating connections, particularly connections to thermally sensitive elements such as semiconductor bodies.

One object of this invention is to facilitate the manufacture of connections, particularly electrical connections to transistors and other components which are detrimentally affected by heat. More specific objects are to bond a lead to a fusible mass to form a low resistance ohmic connection while restricting the heating required to a localized region of the mass in the immediate vicinity of the lead.

A feature of this invention resides in electrically heating a lead which is to be incorporated in a connection by passing the heating current through a portion of the lead and causing that portion of the lead to melt an adjacent fusible mass and embed itself therein. The heating current is confined principally to the lead by connecting the source to the lead on opposite sides of the portion to be connected. The degree of melting of the fusible mass is restricted by the mechanical manipulation of the heated lead and by suitable control of the heating current therein.

Another feature of this invention resides in employing a lead structure which concentrates the heating to the region of its connection with the fusible mass. One means of effecting this concentration is by increasing the electrical power dissipation in and the thermal capacity of a confined region of the lead which is to be bonded as by forming several closely adjacent turns therein.

Figure 1:
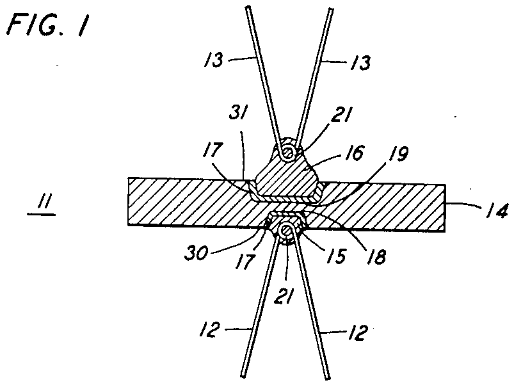
Figure 2:
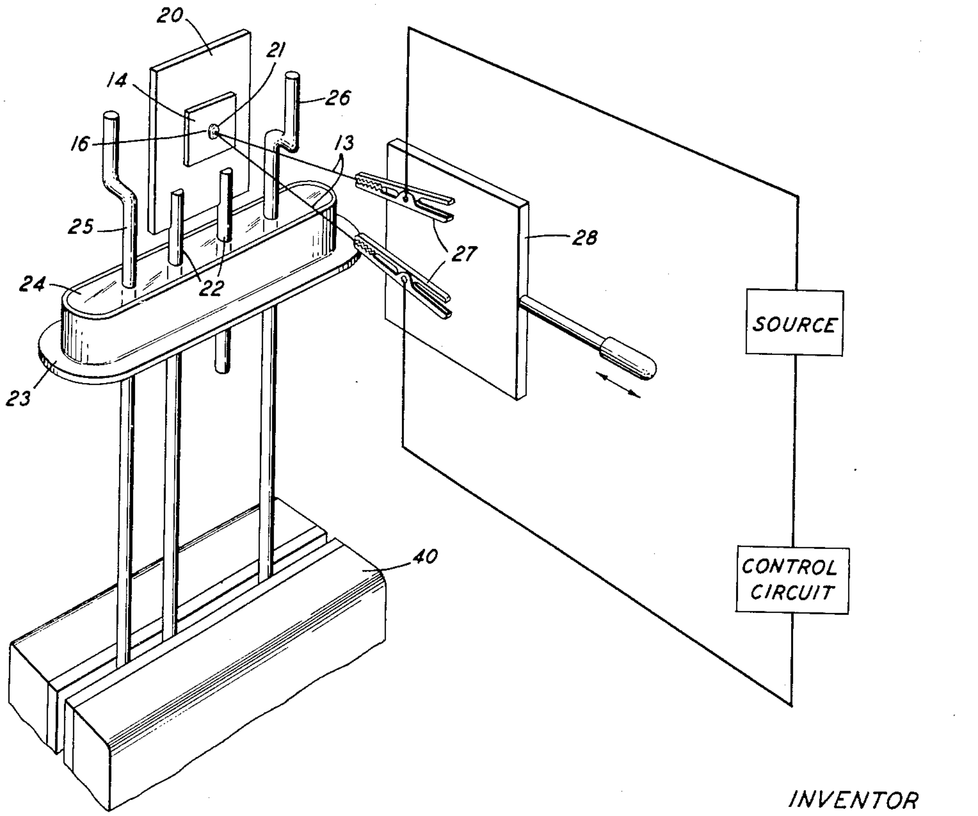

The invention, together with the above and further objects and features, will be more fully understood from the following detailed description when read in conjunction with the accompanying drawing, in which:

Fig. 1 is a sectioned elevation of portions of a transistor showing the form of completed connections made in accordance with this invention; and Fig. 2 is a perspective of a partially fabricated transistor of the type shown in Fig. 1, employing the connection of this invention illustrating the mechanical jigging employed in producing the connection and schematically illustrating the electrical circuit employed.

Referring now to the drawings, Fig. 1 shows a portion of an alloy-type transistor 11 to which emitter and collector leads 12 and 13 have been applied in accordance with this invention. This representation has been greatly enlarged and distorted in its proportions for the purposes of illustration inasmuch as many of the significant dimensions are of the order of mils or fractions of mils. The transistor comprises a thin (about 3.5 mils thick) semiconductive wafer 14, which may be of germanium or the like, having a pair of buttons 15 and 16 alloyed thereto to form emitter and collector regions respectively. The alloying material can be of conventional form, for example lead, indium, gold, aluminum, tin, thallium, or antimony, combinations of these materials, or these materials singly or in combination plus small amounts of additives which control the nature of the interface region 17 between the button and the wafer. In the illustrative structure the semiconductive wafer 14 is of p-type single crystal germanium having a resistivity of 3.5 ohm-centimeter and the emitter and collector buttons 15 and 16 alloyed therewith are of 96.5 percent by weight lead and 3.5 percent by weight arsenic. The alloying process produces masses 15 and 16 composed of lead, arsenic, and a trace of germanium which extend a slight distance (about a tenth of a mil) into the germanium wafer and regions intermediate those masses and the p-type wafer of n-type germanium 17 which each extend about one mil further into the wafer. Thus, the interfacial regions between the p-type wafer and the n-type germanium 17 provide n-p junctions 18 and 19 separated by about 1.5 mils by the intervening p-type material forming the base region of the transistor.

Stable connections of uniform, low, ohmic resistance must be made to the buttons 15 and 16. Soldered connections have heretofore been made between these buttons and leads thereto with varying degrees of success by melting the buttons with conventional soldering irons, blasts of hot gases or by resistance welding wherein current is passed from the lead through the button and a portion of the semiconductive body. None of these techniques have been satisfactory due to the excessive melting of the alloy button, heating of the semiconductor in the vicinity of the junction, and the erratic uncontrolled movement of the button-semiconductor interface and the adjacent n-p junctions. Since the buttons 15 and 16 have a low melting temperature, about 325° C., and are formed by short heat treatments at relatively low temperatures, about 10 minutes at 680° C., further heating in the vicinity of their interfaces with the wafer to or near their melting temperature, will cause the position of the junctions 18 and 19 to advance into the wafer, thereby altering the width of the transistor base layer, causing unwanted changes in the crystalline structure of regions 17 and otherwise detrimetally affecting the electrical characteristics of the transistor. Also, if the buttons are heated to a degree which permits melted material to flow along the wafer surface, the button may flow across the junction 18 or 19 at surfaces 30 or 31 to shunt it and thereby effectively eliminate it. The impurities in the semiconductor which determine the position of the n-p junctions readily diffuse therein at relatively low temperatures, hence it is desirable to reduce the heating of this region to a minimum.

Fused connections can be made to the alloy buttons 15 and 16 in accordance with the present invention without melting the button excessively and without disturbing either the position of the n-p junction adjacent thereto or the regrowth regions 17. As shown in Fig. 1, the connections of this invention comprise a portion 21 of the leads 12 and 13 intermediate their ends embedded in the buttons 15 and 16. In the specific embodiment, the leads each comprise a V-shaped length of wire having a full turn 21 at the apex of the V, which is covered with the button material and frozen therein.

A connection as shown in Fig. 1 can be formed to a transistor in the manner depicted in Fig. 2. A partially fabricated alloy-type transistor, including a wafer 14, alloy butttons 15 (not shown) and 16, and a base plate 20 secured to the wafer by a mechanically stable, low resistance, ohmic connection is secured to a housing header as by spot welding base plate 20 to lead-in wires 22. The housing header comprises a metallic eyelet 23, for example of Kovar, sealed to a glass insert 24 through which are sealed leads 22, 25, and 26. Leads 22, 25, and 26 project about two inches from the bottom of insert 24 and are clamped at their ends as by a vise 40 to provide a cantilever spring support for the partially fabricated transistor. A collector lead, as described above, is supported as by alligator clips 27 attached to movable base 28 so that the bisector of the apex angle of the V is approximately normal to the plane of the wafer 14 and intersects the dome-shaped top of alloy button 16 at its center. The lead is advanced toward the wafer about 5 mils after it has made contact with the button by adjusting the position of base 28 to deflect the lead-in wires 22, 25, and 26 and provide a positive bias tending to force the apex of the V a limited distance into the button. Heating current is then passed through the lead by applying a suitable source to clips 27. When the turns 21 at the apex have exceeded the melting temperature of the alloy of the button, it melts and the turns are pushed into the molten material by the spring tension of leads 22, 25, and 26. Further, if a proper combination of materials has been chosen, the molten alloy will wet and flow over the lead, thereby establishing a more intimate connection therebetween.

Limits are placed upon the process parameters to avoid excessive melting of the alloy button over its surface toward the button edge, and to avoid excessive penetration of the molten region or lead into the depth of the button. The length of the interval during which the limited region of the button is molten is also governed by the rate at which the material is drawn over the lead surface by the wetting action, since an excessive interval will so deplete the molten button material as to leave little or none for the bond. Cooling of the lead and button can in some combinations introduce strains in the frozen bond which lead to erratic electrical characteristics, therefore, it is desirable to mount the elements in a jigging arrangement which will enable at least one element to yield during the contraction of the system and to cool the system gradually over the temperature range where freezing occurs.

One specific example of this type of connection as applicable to an n-p-n alloy germanium transistor having a lead-arsenic mass about 15 mils deep alloyed to the germanium, comprises a 4 mil platinum wire having a total lead length of somewhat greater than one-half inch and two turns at its apex of about 13 mils inside diameter. This choice of materials enables the bonding to be done in air since platinum can be heated in air to an orange heat without damage. Leads of other materials such as gold or aluminum can be employed according to this process but the bonding must then be done in an inert atmosphere to avoid undesirable chemical reactions and at pressures in excess of atmospheric to prevent evaporation of the lead when it approaches its melting temperature. Further, the platinum lead requires no flux, whereas some other materials would, applied for example by dipping the loop 21 therein just prior to bringing it into contact with the button. In producing this connection the terminals of a source of current are connected to the lead on opposite sides of the apex and about 2.2 amperes are passed between those connections for about two seconds to bring the loop to an orange color. The control circuit can be arranged to increase the current to and decrease it from the maximum over intervals which enhance the characteristics of the connection of the order of seconds. Advantageously, the connection can be annealed during the cooling by gradually reducing the current in the loop to zero over an interval of somewhat more than a second, thereby permitting the button material to refreeze before the contraction of the cooling lead loosens or breaks the connection. The heating current can be either alternating or direct. When a connection is fabricated with these parameters, the lead apex is forced into the button and effectively joined both electrically and mechanically thereto without melting the entire button. The apex advances about 5 mils toward the wafer and the molten region extends about 5 or 6 mils beyond that depth while a transverse area of less than 10 mils diameter is melted. Thus, the molten portions of the button are spaced a few mils from the button-semiconductor interface even at the instant of maximum melting.

While the invention has been described above as applied to semiconductive devices, it is to be understood that it is not so limited. It is equally suitable for other components having fusible masses into which an electrically self-heated element can be fused and frozen, particularly in applications where it is undesirable to heat the component. Further, the form of the lead and its method of application in producing the connection of this invention, can readily be modified without departing from the spirit thereof. For example, the lead wire may be taken from a spool, formed with a loop intermediate its end and the spool, bonded to a fusible mass by the passage of a heating current and severed from the spool immediately adjacent the bond, thereby providing only one lead from the bond. As an alternative to the use of a loop at the point the connection is to be formed, a wire or ribbon of sufficient thermal capacity along any unit length that a single portion melts a portion of the fusible mass it engages, may be employed, a localized portion of the lead may be reduced in cross section to increase its resistance and thus concentrate the heating effect of the current in that region.

It is to be understood that the above-described arrangements are illustrative of the application of the principles of the invention. Numerous other arrangements may be devised by those skilled in the art without departing from the spirit and scope of the invention.

What is claimed is:

1. The method of connecting a lead to a germanium body which comprises fusing a mass comprising a portion of said body and a large proportion of lead to form an alloy button on said body, forming a platinum wire of about 4 mils diameter into a V shape with a full turn at its apex, mounting the wire apex in contact with a central portion of said button, connecting the terminals from a current source to the wire on opposite sides of the apex, passing about 2.2 amperes between said terminals for about two seconds to melt a limited portion of said button, advancing said apex into said melted button portion, and reducing the current in the wire while maintaining it in contact with the button to freeze the melted button portion while it is in contact with said apex.

2. The method of connecting a lead to a semiconductive body which comprises fusing a mass comprising a portion of said body and a metal to form an alloy button on said body, said button having a melting temperature below that of the semiconductive material, forming a wire into a V shape with at least a full turn at its apex, mounting the wire apex in contact with a central portion of said button, connecting the terminals from a current source to the wire on opposite sides of the apex, maintaining an atmosphere around said wire which is inert thereto at temperatures in excess of the melting temperature of the fusible mass, passing current between said terminals and through said apex to heat said wire above the melting temperature of said alloy button and to melt a limited portion only of said button, advancing said apex into said melted button portion, limiting both the heating current and the time of heating to prevent the extension of the melted button portion to the button-body interface, and reducing the current in the wire to freeze the melted button portion while it is in contact with said apex.

3. The method of establishing a connection between an electrically conductive element and a mass of fusible material overlying a critically positioned temperature sensitive p-n junction produced by alloying and diffusion in a semiconductive body region comprising forming a wire into a V-shape with at least one full turn having adjacent lengths aligned at its apex, mounting the wire apex in contact with a central portion of said fusible mass, connecting the terminals from a current source to the wire on opposite sides of the apex, maintaining an atmosphere around said wire which is inert thereto at temperatures in excess of the melting temperature of the fusible mass, said mass having a melting temperature below that of the semiconductive body, passing current between said terminals and through said apex to heat said wire above the melting temperature of said fusible mass and to rapidly melt a limited portion of said mass, advancing said apex into said melted portion to at least partially cover said adjacent lengths of wire at said apex, limiting both the heating current and the time of heating to prevent the extension of the melted portion of said mass to within a few mils of the p-n junction, and reducing the current in the wire to freeze the melted portion of said mass and anchor said wire therein.

References Cited in the file of this patent

UNITED STATES PATENTS

| | | |
|---|---|---|
| 2,634,322 | Law | Apr. 7, 1953 |
| 2,644,852 | Dunlap | July 7, 1953 |
| 2,646,536 | Benzer et al. | July 21, 1953 |
| 2,704,818 | North | Mar. 22, 1955 |

FOREIGN PATENTS

| | | |
|---|---|---|
| 697,869 | Great Britain | Sept. 30, 1953 |